United States Patent [19]

Hamil et al.

[11] Patent Number: 5,313,485
[45] Date of Patent: May 17, 1994

[54] LUMINESCENT LIGHT SOURCE FOR LASER PUMPING AND LASER SYSTEM CONTAINING SAME

[75] Inventors: Roy A. Hamil, Tijeras; Carol S. Ashley, Albuquerque; C. Jeffrey Brinker, Albuquerque; Scott Reed, Albuquerque; Robert J. Walko, Albuquerque, all of N. Mex.

[73] Assignee: Sandia Corporation, Albuquerque, N. Mex.

[21] Appl. No.: 966,473

[22] Filed: Oct. 26, 1992

[51] Int. Cl.$^5$ .................................. H01S 3/0915
[52] U.S. Cl. ...................................... 372/69; 372/70; 372/80
[58] Field of Search ............... 372/69, 70, 80; 362/84; 252/646, 647

[56] References Cited

U.S. PATENT DOCUMENTS

| | | | |
|---|---|---|---|
| 4,855,879 | 8/1989 | Soltani et al. | 362/84 |
| 4,997,597 | 3/1991 | Clough et al. | 252/646 |
| 5,078,919 | 1/1992 | Ashley et al. | 252/646 |
| 5,122,305 | 6/1992 | Ashley et al. | 252/646 |
| 5,137,659 | 8/1992 | Ashley et al. | 252/646 |

OTHER PUBLICATIONS

Kaschke et al., Chem. Phys. Letters, vol. 168, No. 6, pp. 543-549 (May 18, 1990).
Reed et al., "Porous Optical Composites," SPIE vol. 1328, Sol-Gel Optics (1990) Jul.
*Radioluminescent Lighting Technology: Technology Transfer Conference Proceedings*, Sep. 25-26, 1990, Annapolis, Md., Chapters 10-13.

*Primary Examiner*—Rodney B. Bovernick
*Assistant Examiner*—Robert McNutt
*Attorney, Agent, or Firm*—Timothy D. Stanley; George H. Libman

[57] ABSTRACT

The invention relates to a pumping lamp for use with lasers comprising a porous substrate loaded with a component capable of emitting light upon interaction of the component with exciting radiation and a source of exciting radiation. Preferably, the pumping lamp comprises a source of exciting radiation, such as an electron beam, and an aerogel or xerogel substrate loaded with a component capable of interacting with the exciting radiation, e.g., a phosphor, to produce light, e.g., visible light, of a suitable band width and of a sufficient intensity to generate a laser beam from a laser material.

31 Claims, 2 Drawing Sheets

LUMINESCENT LIGHT SOURCE FOR LASER PUMPING AND LASER SYSTEM CONTAINING SAME

The U.S. government has rights in this invention pursuant to Contract No. DE-AC04-76DP00789 between the U.S Department of Energy and AT&T Technologies, Inc.

BACKGROUND OF THE INVENTION

The present invention relates to the use of light-emitting, solid-state compositions as a light source for laser pumping and laser systems containing same.

In conventional laser systems, active atoms or molecules of a lasing medium (gas, liquid, or solid type) are "pumped" by a source of exciting energy. This optical pumping excites the active atoms or molecules into a higher or excited energy level. When the number of atoms/molecules in the excited state reaches a certain threshold level (i.e., the level at which the number of excited active atoms in the upper laser state is greater than the number of active atoms in the lower laser state), light of sufficient energy can then induce or stimulate the excited atoms/molecules to make the transition to the ground state, causing light emission and amplification. In addition, lasers are generally provided with resonators which cause the emitted light to further amplify and increase in intensity. In certain situations, for example, if the gain is high enough, resonators may not be necessary.

In optically pumped lasers, which may be liquid, gas, or solid lasers, the source of exciting energy or pumping means is often a source of electromagnetic radiation.

Examples of such pumping means are flash lamps such as xenon-filled glass or quartz tubes. These lamps are made to flash by discharging a high voltage through the xenon gas. Other pumping means are mercury arc lamps, light-emitting semiconductor diodes, and other lasers.

Flash lamps emit light over a broad wavelength band. Their pumping efficiency is, therefore, low because the absorption band of the lasing material almost always comprises only a small portion of the flash lamp emission spectrum. For example, conventional flash lamps generally emit a continuous spectrum of light, from ultraviolet, through visible, and into the infrared range. Conversely, titanium sapphire, a lasing material, has a peak adsorption at about 470 nm. Thus, most of the light emitted by a conventional flash lamp is wasted.

In many cases, lasers cannot be made from potentially useful materials because the intensity required exceeds what a flash lamp could provide due to the optical opacity of the discharge or the ultimate power delivery limits of the flash lamps themselves. In other words, for some potential lasing materials, the maximum light intensity of flash lamps may not be adequate to achieve the threshold for lasing. Generally, the maximum power of conventional flash lamps is several megawatts per cubic centimeter at peak intensity.

The duration of the pumping pulse can be a determining factor of a laser's power. The pumping pulse is the actual period of the optical energy emission from the pump source. For many high power lasers, the pumping pulse duration must be shorter than the fluorescence lifetime of the excited state. The more energy that can be pumped into the laser during that time, the more active atoms/molecules will be excited and the more probable the lasing material will reach the threshold level necessary for stimulated emission.

If the pump pulse duration exceeds the fluorescent lifetime, the laser may still lase if the pump rate, the rate at which active atoms/molecules are excited into the upper energy level, exceeds the deactivation rate, the rate at which excited atoms/molecules decay to the ground state. Generally, though, it is desirable to have a pumping pulse which is shorter than the fluorescent lifetime.

The pumping pulse duration of flash lamps is generally slow, typically on the order of milliseconds. For many popular applications, the pulse duration is about 0.1–10 milliseconds. High power lasers pumped with such flash lamps, therefore, must have relatively long fluorescent lifetimes, e.g., on the order of milliseconds. Flash lamps can sometimes operate in a continuous mode, but this is highly dependent on the characteristics desired by the laser designer.

SUMMARY OF THE INVENTION

An object of the invention is therefore to provide a light source suitable for use as a laser pumping means which does not exhibit the disadvantages, or does so only to a small extent, of the conventional pumping lamps for lasers. Also, an object of the invention is to provide a light source suitable for use as a pumping lamp in conjunction with lasers, whereby the pumping lamp permits the use of previously unsuitable lasing material.

Another object of the invention is to provide a laser system comprising a lasing material, resonator(s), a source of exciting energy, and a flash lamp as discussed above for pumping the lasing material. A further object of the invention is to provide a method of generating a laser beam using the previously described laser system. Furthermore, another object is to provide a method of optically pumping a lasing material using a novel light source, as discussed above, as the pumping means.

Objects of the invention also include providing an intense light source which will:

(1) efficiently pump a laser by matching the emission spectrum of the pumping light to the absorption band of a laser material;

(2) offer the potential for higher powered lasers by shortening the pump pulse duration to substantially less than the fluorescent lifetime of the lasing material; and (3) be resistant to damage by the high power excitation pulses employed to activate it.

Upon further study of the specification and appended claims, further objects and advantages of this invention will become apparent to those skilled in the art.

These objects are achieved by a laser pumping means comprising:

(a) a porous substrate loaded with a component capable of emitting light upon interaction of the component with exciting radiation, and (b) a source of exciting radiation.

The present invention thus relates to luminescent compositions which emit light by the interaction of luminescent components with a source of exciting radiation. In particular, the present invention relates to luminescent compositions, especially cathodoluminescent and photoluminescent compositions, and the employment of such compositions as a light source for pumping a laser.

For a discussion on luminescent materials (e.g., phosphors and luminescent glasses) and their uses, see J. B.

Birks et al., *Scintillation Counters,* McGraw-Hill Book Co., Inc., 1953; P. Goldberg (editor), *Lumination of Inorganic Solvents,* "Cathodoluminescence", pp. 151–184, 1966; H. W. Leverenz et al., *Luminescent Materials,* Vol. 10, July, 1939, pp. 479–493; H. W. Leverenz, "Cathodoluminescence as Applied in Television", RCA Manufacturing Co., Inc., Harrison, N.J., pp. 131–175; H. W. Leverenz, "Phosphors Versus the Periodic System of the Elements", Proceedings of the I.R.E., May, 1944, pp. 256–263; C. Feldman, "Development and Applications of Transparent Cathode-Ray Screens", Journal of the S.M.P.T.E., Vol. 67, July, 1958, pp. 455–460; G. W. Ludwig et al., "The Efficiency of Cathode-Ray Phosphors", J. Electrochem. Soc., Vol. 117, No. 3, March, 1970, pp. 348–353; and, J. D. Kingsley et al., "The Efficiency of Cathode-Ray Phosphors", J. Electrochem. Soc., Vol. 117, No. 3, March, 1970, pp. 353–359.

Cathodo-luminescent compositions are used, for example, in television picture tubes. A phosphor layer is applied to the wall of a cathode ray tube. An electron beam hits and excites the phosphor layer, causing the latter to emit light. Photo-luminescent materials emit light when excited by photons of sufficient energy. Examples of such photo-luminescent materials are day glow tapes and consumer products which glow in the visible spectrum upon illumination with ultraviolet light.

Compositions providing radioluminescence, a type of cathodo-luminescence, are also well known and are, for example, used as alternatives to conventional electric light sources. Radioluminescent lamps have been employed in such applications as safety lighting, emergency signs (e.g., exit signs), airport runway lights, background lighting for aircraft and space applications, and other applications where electrical light is either difficult or impossible.

Conventional radioluminescent lamps comprise a phosphor powder deposited on the inside surface of a hollow glass tube. The hollow glass tube is then evacuated and backfilled with a beta-emitting radioisotope, usually tritium gas. Beta particles produced by the radioactive decay of tritium atoms impinge upon the phosphor resulting in the release of energy in the form of light. See, e.g., U.S. Pat. No. 4,855,879 (Soltani et al.).

Related patent application Ser. No. 07/435,092, filed Nov. 13, 1989 (Clough et al.), now U.S. Pat. 4,997,597, issued Mar. 5, 1991, hereby incorporated by reference, discloses radio-luminescent compositions comprising a zeolite crystalline material in which is adsorbed a tritium-containing component and at least one luminophore. The loaded zeolite can be suspended in an optically clear polymer or optically clear silica matrix (e.g., silica gel). Another disclosed embodiment comprises an optically clear polymer matrix, a soluble tritiated organic component containing olefinic or alkynylic bonds prior to tritiation and an organic scintillation dye for transferring primary scintillation to a red shifted emission.

In addition, related Application Ser. Nos. 07/495,578; 07/495,579; and 07/495,580, all filed on Mar. 20, 1990, all of which are hereby incorporated by reference, disclose, inter alia, xerogel and aerogel substrates doped with luminescent materials, such as phosphors and luminescent glasses, wherein the substrate also contains a source of exciting radiation (e.g., tritium as a source of $\beta$-particles) which interacts with the luminescent material to emit radiation of another energy (e.g., light). The resultant composition can function as a volumetric light source. Another disclosed embodiment is, for example, a phosphor doped aerogel which emits visible light upon interaction with a source of ultraviolet light.

According to one embodiment, the present invention comprises pumping means for optically pumping a laser material, comprising a porous substrate loaded with a component capable of emitting light upon interaction with exciting radiation, and a source of exciting radiation.

According to another embodiment, the invention comprises an apparatus for use in generating a laser beam comprising a laser material, resonator means, and pumping means, wherein the pumping means comprises a porous substrate loaded with a component capable of emitting light upon interaction of the component with exciting radiation.

Another embodiment of the invention relates to a laser apparatus comprising:

a laser material;

resonator means;

a porous substrate loaded with a component capable of emitting light upon interaction with an exciting radiation; and a source of exciting radiation, wherein, upon interaction with the exciting radiation, the loaded porous substrate can emit light within the absorption band width of the laser material and of a sufficient intensity to generate a laser beam.

A further embodiment of the invention relates to a method of generating a laser beam comprising:

pumping a laser material with a flash lamp wherein the flash lamp is a porous substrate loaded with a component capable of emitting light, upon interaction of the component with an exciting radiation, wherein the emitted light is within the absorption band width of the laser material and of a sufficient intensity to generate a laser beam, and wherein the flash lamp is activated by exposing the component to a source of exciting radiation.

A further embodiment of the invention is a method of optically pumping a lasing material comprising subjecting the laser material to light emitted from a component, the component being loaded in a porous substrate, wherein the component emits light by exposure to a source of exciting radiation.

The term "porous substrate" is intended to mean a solid structure of any suitable form or shape having a substantial porosity, e.g., at least about 30 vol. %, wherein the pores of the structure provide a means of obtaining a low density matrix for holding the luminescent component in suspension. The substrate is preferably one which exhibits a substantially high porosity and an associated low density to limit absorption of the exciting radiation. A "highly porous substrate" in the context of the invention is a solid structure having a porosity of at least about 80 vol. %. Materials exhibiting a porosity of at least about 85 vol. %, particularly at least about 95 vol. %, and especially about 99 vol. %, are preferred for use as the porous substrate.

The pore size distribution of the substrate is generally in the range of about 1 nm–500 nm, preferably about 1 nm–200 nm, and especially about 1 nm–50 nm. The surface area of the porous substrate is generally at least about 300 m$^2$/g, preferably at least about 500 m$^2$/g, particularly greater than about 1000 m$^2$/g, and especially about 1200 m$^2$/g.

The substrate should be capable of transmitting at least a portion of the generated light. For example, the substrate should transmit at least about 10%, 20%, 30%, etc. of the generated light. The substrate preferably transmits the light generated to a substantial degree, e.g., at least about 40%. Particularly, at least about 50% of the light generated by the luminescent material, especially at least 60%, 70%, 80%, 90%, or about 100%, is transmitted.

Similarly, the porous substrate should be transparent to at least a portion of the exciting radiation so that the exciting radiation can interact with the luminescent component and thereby emit light. For example, the substrate should be transparent to at least about 10%, 20%, 30%, etc., of the exciting radiation. Preferably, the substrate is transparent with respect to the exciting radiation to a substantial degree, e.g., at least about 40%. Particularly, the substrate is transparent to at least 50%, especially 60%, 70%, 80%, 90%, or about 100%, of the exciting radiation.

Low density material is preferred for the porous substrate to minimize absorption of both the exciting radiation and the transmitted light, and to obtain a deep penetration of the exciting radiation into the substrate. The density is generally about 0.01–1.5 g/cm$^3$, preferably about 0.01–0.50 g/cm$^3$, especially about 0.01–0.3 g/cm$^3$.

The substrate is preferably a material exhibiting a low coefficient of thermal expansion (CTE), thereby minimizing damage risks associated with exposure to high intensity exciting radiation. Therefore, the coefficient of thermal expansion is preferably as close to zero as possible. In general, the CTE of the substrate is about $0-30 \times 10^{-7}$ in/in/°C., preferably about $0-7 \times 10^{-7}$ in/in/°C., especially about $5-7 \times 10^{-7}$ in/in/°C. The CTE for an $SiO_2$ substrate is about $5.5 \times 10^{-7}$ in/in/°C.

The substrate is preferably a porous, inorganic material which is not and does not contain a zeolite crystalline material. Such substrates include, e.g., xerogels and aerogels.

Thus, dried inorganic gels, i.e., xerogels and aerogels, are preferred materials for the porous substrate component of the composition. The production of xerogels and aerogels is well known in the art, and they can be provided in a variety of shapes, e.g., cylinders, plates, sheets, or fibers. Aerogels and xerogels can, for example, be produced from essentially any composition capable of forming a gel.

Typically, xerogels and aerogels are produced by the polymerization of components containing inorganic metal ions and oxygen ions such as metal oxides, alkoxides, and alcoholates. Metal sulfides may also be suitable. Polymerization results in the formation of a gel containing the polymerized material and a liquid as two continuous phases. The liquid dispersion medium is removed by slow drying or supercritical drying and can result in little or no shrinkage of the underlying structure of the polymerized material.

Generally, xerogels are those structures resulting from air evaporation (or evaporation under normal conditions) of the liquid dispersion medium. Aerogels, which generally exhibit a higher porosity, are produced when drying is performed under supercritical conditions. For example, xerogels generally possess a porosity of up to about 60 or even 80 vol. %, although higher porosities may be possible. Aerogels, on the other hand, can possess a higher porosity, e.g., greater than about 90 vol. %. For a detailed discussion regarding the production of both xerogels and aerogels, see *Aerogels: Proceedings of the First International Symposium*, Wurzburg, Federal Republic of Germany, Sep. 23–25, 1985, J. Fricke, ed., Springer-Verlag, Berlin-Heidelberg (1986).

With respect to density, aerogels with bulk densities as low as 0.008 grams/cc have been prepared (Hrubesh et al., "The Characterization of Ultra-Low Density Silica Aerogels Made From a Condensed Silica Precursor," *Better Ceramics Thorough Chemistry IV*, Materials Research Society, 1990, in press); however, mechanical properties are poor at these ultra-low densities.

In addition, xerogel and aerogel substrates, such as a silica aerogel, have a relative low coefficient of thermal expansion, e.g., about $5.5 \times 10^{-7}$ in/in/°C. These substrates, therefore, have a high resistance to thermal shock such as that which could be induced by laser operation (for example, from the exciting radiation). The high porosity of such substrates may also tend to increase their resistance to thermal shock.

The materials used in the formation of aerogels and xerogels are, for example, oxides of such elements as Si, Al, B, Ti, Zr, V, Y, Mg, Mo, Fe, etc. Examples of suitable starting materials include $SiO_2$, $Si(OCH_3)_4$, $Si(OC_2H_5)_4$, $AlOOH$, $Al(OC_4H_9)_3$, $B(OC_4H_9)_3$, $Ti(OC_3H_7)_4$, $Zr(OC_3H_7)_4$, $TiO_2$, $ZrO_2$, etc., and mixtures thereof such as $SiO_2$—$Al_2O_3$, $SiO_2$—$ZrO_2$, $SiO_2$-$B_2O_3$, and $Al_2O_3$-$ZrO_2$. Preferably, the porous substrate is a silica aerogel.

Clear silica aerogels can be prepared using $Si(OCH_3)_4$, tetramethylorthosilicate (TMOS), or $Si(OC_2H_5)$, tetraethylorthosilicate (TEOS), as starting materials. Due to the toxicity of TMOS, TEOS is preferred. Recent advances have produced highly transparent aerogels using a base-catalyzed TEOS system, resulting in more robust aerogels with significantly less shrinkage than acid-catalyzed aerogels. J. Fricke, ed., *Aerogels*. Springer Proceedings in Physics, Vol. 6, Springer-Verlag, Berlin (1986).

Scattering (lack of clarity) in aerogels occurs not only from the small spherical linkages that make up the aerogel skeleton but also as a result of slight differences in aerogel density. The clarity of TEOS silica aerogels is influenced by TEOS concentration, amount of hydrolysis water, pH, solvent, aging, and gelation temperature. Adjustment of these parameters can, therefore, enhance the clarity of aerogels and in turn enhance transmission of the generated light and/or exciting radiation.

During the supercritical drying step in aerogel production, the portion of the gel originally occupied by liquid is ultimately replaced by a non-condensed gas with little or no associated shrinkage. The highly porous final material is composed of continuous, interpenetrating solid and gaseous phases. Two known processes for aerogel preparation are: (1) direct removal of solvent (usually ethanol or methanol) under supercritical conditions, or (2) replacement of the solvent at low temperatures with liquid $CO_2$. $CO_2$ processing of base-catalyzed gels has been found to produce slightly clearer aerogels than the direct, higher temperature processing. Tewari et al., "Microstructural Studies of Transparent Silica Gels and Aerogels," Better Ceramics Through Chemistry, eds. C. J. Brinker et al., Vol. 73, Materials Research Society, Pittsburgh (1986).

A near-zero-shrinkage (NZS) aerogel composition and process, developed at Sandia National Laboratories, is the preferred porous substrate for the luminescent material, e.g., phosphor particle, loading. A description of NZS aerogel production process is provided in, for example, Application Ser. No. 07/495,579, incorporated herein by reference (see also Example I, infra).

The NZS aerogel production process reduces stresses due to shrinkage during aging (syneresis) and during critical point drying. Stresses arising from phosphor particle/substrate interactions and substrate collapse around the phosphor particle are also minimized. An NZS aerogel typically has a density of 0.075–0.30 g/cc, e.g., 0.15 grams/cc, and a surface area of 600–1200 $m^2$/gram, depending upon the exact composition and processing conditions.

The high porosity of xerogel and aerogel substrates provides an efficient means for heat exchange between substrates and its surroundings. The high porosity permits heat exchange between not only the substrate surface and ambient gas or other suitable cooling medium, but also allows internal regions of the substrate to be so cooled.

In addition to high porosity and low coefficients of thermal expansion, xerogel and aerogel substrates have a further beneficial feature. Aerogels and xerogels are resilient and compliant and thus tend to damp out vibrations. The ability to damp vibrations reduces the likelihood of breakage.

The term "loaded" is intended in the broadest sense of the word. Thus, loaded, e.g., means any form of association or contact, direct or indirect, which results in a composite composition, the components of which are capable of performing their intended functions (such as acting as a substrate or emitting light). Loaded thus includes, for example, any type of incorporation, such as encapsulation, embedding, entrapment, or the like, as well as any form of bonding such as physisorption, absorption, adsorption, chemisorption, covalent bonding, etc. Preferably, the luminescent material is loaded within an aerogel or xerogel substrate, particularly an aerogel. Thus, ZnS phosphor particles entrapped within a low density, low pore size, aerogel matrix is an example of a loaded porous substrate.

The component used to emit light from the porous substrate is a luminescent material. The luminescent material should be one capable of being adequately loaded into the substrate. Moreover, the component should be capable of emitting light within the absorption wavelength band of a lasing material. Generally, the component should emit a wavelength within the ultraviolet ($10^2$–$4 \times 10^2$ nm), visible ($4 \times 10^2$–$7 \times 10^2$ nm), or infrared ($7 \times 10^2$–10 nm) light regions, i.e., about $10^2$–$10^4$ nm. Vacuum ultraviolet or soft X-ray may also be suitable. Likewise, the component should be capable of emitting such radiation upon interaction with an acceptable exciting radiation, i.e., one which does not cause excessive damage to the substrate and/or the component.

The component which acts as the source of emitted light is preferably an inorganic or organic, gas, solid, or liquid, cathodo-luminescent or photo-luminescent species, e.g., noble gases, luminescent glasses, phosphors, fluorescent dyes suspended in a suspension medium, or mixtures thereof. Preferably, the luminescent material possesses an emission spectrum which matches the laser absorption spectrum.

Phosphors are well known in the art and include, for example, zinc sulfide, zinc oxide, zinc orthosilicate, siliver-, copper-, thulium-, and aluminum-activated zinc sulfides, cadmium sulfide, CsI:Na or CsI:Tm. Many other known phosphor components are discussed in the references listed above.

In the case of phosphors, the exciting radiation can be, for example, an electron beam having a penetration range of 0.1–2 cm, and the emitted radiation can have a wavelength of $10^2$–$10^4$ nm. Generally, the energy range of the electron beam can be about 100–$10^6$ eV, preferably about 2000–300,000 eV.

Phosphors typically emit light in relatively narrow wavelength bands. Some rare earth-doped phosphors will even emit most of their energy in narrow lines. Suitable crystalline cathodo-luminescent phosphors are zinc or cadmium sulfide doped with specific activators. The efficiency (light energy out/electron energy in) of zinc sulfide doped with silver is reported to be 25%. Its emission is a relatively broad band ranging from 400–600 nm. Zinc sulfide doped with thulium is about 18% efficient, with its emission peaked at 477 nm, and a half-width at half-maximum of about 10 nm. By matching the phosphor emission band to the absorption band of the laser of interest, an efficient pumping system results.

Phosphors can have decay times ranging from a few nanoseconds to many seconds. In the context of the invention, preferred phosphors of interest are those with as short a decay time as possible so that the emitted light can quickly pump the lasing material.

Phosphor particle size can vary within a wide range, e.g., 0.001–20 micron. Smaller size particles are preferred, e.g., 0.1–2 microns, although larger particles, such as 2–20 microns, are also suitable.

The use of smaller particles 0.01–0.4 microns, e.g., about 0.4 microns, will enhance transparency of the composite and thereby increase the optical depth and light intensity of the composite. Procedures for making phosphor particles within the range of 0.001–0.01 microns are known. See Muller et al., Chemical Physics Letters, Vol. 168, No. 6, pp. 543–550 (May 18, 1990).

The phosphor particles are preferably dispersed throughout the porous substrate. For example, soluble or insoluble phosphor particles can be added to a sol dispersion which is subsequently gelled and dried to form a xerogel or, preferably, an aerogel. When water is the solvent or dispersion medium, water soluble phosphors such a thallium activated cesium iodide or thallium activated potassium iodide can be used advantageously. In such cases, the use of water soluble phosphors can enhance transparency of the resultant phosphor doped xerogel or aerogel. Solvents or dispersion media other than water can also be used.

Loading of phosphors within the porous substrate can also involve in situ growth and activation of the phosphor particles, whiskers, or fibers within a wet or dry gel, mechanical agitation to break up agglomerates and aid dispersion, and/or the use of surfactants.

Generally, the phosphors are loaded in the porous substrate at 0.005–1 g of phosphor per cc of substrate.

As discussed above, a NZS aerogel can have a density of about 0.15 g/cm$^3$. Using a phosphor powder loading of about 0.5 g per cm$^3$ of the substrate and an electron beam of sufficient energy (about 200–600 keV), most of the energy will be deposited in the phosphor thereby providing highly efficient utilization of the exciting radiation.

Inorganic crystalline phosphor powders are typically highly reflective. A dispersion (composite) of such a phosphor in an aerogel or xerogel at a density less than the loose pack density of the phosphor powder can be translucent (rather than opaque) to light generated up to some depth within the composite. If all of the dispersed phosphor crystallites are simultaneously excited, the light output should be brighter than from an equivalent thickness of loose packed phosphor powder, since the reflectivity of the phosphor would aid in allowing light from some depth within the more open-structured composite to escape. This should result in a brighter light for a given excitation input power uniformly exciting the phosphor than would be attainable from a phosphor film on a transparent substrate.

Due to the porous nature of the, for example, xerogel or aerogel substrate, the dispersed phosphor particles are able to cool more quickly (e.g., by heat exchange with gas within the pores) than an equivalent layer of phosphor powder or a solid crystal of phosphor material. The susceptibility to thermal damage of the phosphor is therefore reduced. Also, phosphor particle loaded aerogels exhibit improved mechanical strength in a manner that may be analogous to the strength imparted to concrete by aggregate.

Luminescent glasses, e.g., lithium rich silicate glass doped with cerium are also well known in the art. In comparison to crystalline phosphors, luminescent glasses are generally amorphous materials having luminescent characteristics.

In the case of luminescent glasses, the exciting radiation can be, for example, an electron beam with a penetration range of 0.1-1.0 cm and an energy range of 100-$10^6$ eV. The emitted radiation has a wavelength of, e.g., about 350-400 nm.

Luminescent glasses can be ground into a powder and dispersed in the porous substrate, e.g., a silica aerogel. Such luminescent glasses can be incorporated in situ in the sol or either the wet or dry gel.

By closely matching refractive indices of the porous substrate and the luminescent glass, the transparency of the resultant composite can be enhanced.

Other approaches for using luminescent glasses include: (1) making a luminescent aerogel directly using sol-gel chemistry to achieve the appropriate luminescent glass composition, and (2) making a luminescent gel using well known luminescent ionic species. An example of the latter is an alumina based aerogel with $Cr(+++)$ ions substituted for the aluminum, i.e., a "ruby" aerogel. Either approach offers the possibility of a volumetric radiation source with a high degree of optical clarity.

When using powdered luminescent glasses, the component preferably has a small particle size, e.g., a diameter equal to 1/10 the wavelength of emitted radiation, e.g., about 50 nm. Thus, suitable particle sizes are about 10 nm—100 nm, although larger particle sizes are possible.

In the resultant substrate/luminescent glass product, the concentrations of the luminescent species can vary greatly. For example, the luminescent glass can, in general, constitute about 0.1-90 wt % of the total weight of the composite, i.e., porous substrate plus component.

For a discussion of luminescent glasses, see R. J. Ginther, J. H. Schulman, "Glass Scintillators", Trans. IRE, N.S. Vol. 5, p. 92 (1958) [Ce-activated glass], and Mark D. Newsham, Michael K. Cerreta, Kris A. Berglund, u Daniel G. Nocera, "Luminescent Oxide Gels", MRS Res. Soc. Sym. Proc. Vol. 121, pp. 627-630 (1988) (photoluminescence employing molybdenum hexachloride).

In addition, the luminescent component can be uranium compounds incorporated into the porous substrate, e.g., a xerogel or aerogel. In this manner, the substrates obtain the photoluminescent properties of uranium glass. Suitable uranium compounds are those in which U has a +6 valence. In this embodiment, the exciting radiation is, for example, an electron beam having a penetration of about 0.1-1 cm, and the emitted radiation has a wavelength of about 100-$10^3$ nm. The energy range of the electron beam is generally about 100-$10^6$ eV.

The noble gases, such as Xe and Ar, are known to have high cathodo-luminescent conversion efficiencies, in the range of 25-75%, with an emission wavelength in the ultraviolet, approximately 150-220 nm. A noble gas, e.g., xenon, with a suitable dopant (e.g., a small amount of oxygen gas), the emission spectrum can be shifted to a more useful range. Such a gas mixture within the pores of the porous substrate could be used as the source of exciting radiation. For example, electron bombardment of the noble gas will induce emission of exciting radiation, e.g., ultraviolet light. The UV light can then interact with, e.g., phosphor particles within the porous substrate to produce a desired emitted radiation.

The noble gas can be infused into the pores of the porous substrate as a trapped gas. Alternatively, the nobel gas can be weakly chemically bound to the porous substrate. The concentration of noble gas is, for example, about 0.01-100 atm as a gas or equivalent thereof as a chemically bound entity. The exciting radiation can be, e.g., an electron beam with a penetration range of, for example, 0.1-1.0 cm, and the emitted radiation has a wavelength of, e.g., $10^2$-$10^3$ nm.

Suitable sources of exciting radiation are materials which emit electromagnetic radiation or an electron beam. The exciting radiation source should not emit radiation of a type which will excessively damage either the substrate or the component which emits light. However, there should be sufficient energy to excite the luminescent component. Thus, the power and energy of the exciting radiation should be sufficient to excite the luminescent component but not unduly damage either the substrate or the component therein. The exciting radiation can, for example, be ultraviolet light, visible light, infrared light, or an electron beam. Preferably, the exciting radiation is an electron beam.

Typical sources of exciting radiation and their energy ranges are given below:

| Source | Energy level |
| --- | --- |
| 1. Electron beam | 100 to $10^6$ electron volts (ev), preferably about 2000 to 600,000 ev, especially about 2000 to 300,000 ev. About 0.25 × $10^6$ (ev) is preferred for large laser structures. |
| 2. Photon source | |
|   a. UV pump energy | 3 ev to 9 ev |
|   b. Visible pump | 1.5 ev to 3 ev |
|   c. Infrared | 0.1 ev to 1.5 ev |

Laser materials which can be used in accordance with the invention are, for example, solid state lasers or liquid lasers. The inventive pumping means may even be useful with gaseous lasers. The solid state lasers are glasses with rare earth ions such as Nd, Er, and Yb, e.g., Nd doped phosphate or silicate glasses, Nd YAG (yttrium aluminum garnet), GaAs, and titanium sapphire, amongst others. The liquid laser media are typically dye lasers, e.g., Rhodaine 6G ® and other suitable organic dyes. Suitable laser materials are described in Amnon Yariv's, *Introduction to Optical Electronics*, Holt, Reinhart, and Winston, Inc. (1971).

The operational mode of the laser is preferably a pulse mode; however, the laser may operate continuous wave in certain cases where the kinetics of the laser allow it. For example, if the rate of excitation exceeds the rate of deactivation of the laser state, continuous operation may be possible.

The peak intensity of the flash lamp according to the invention, especially for aerogel substrates, can be orders of magnitude greater than that of conventional flash lamps.

In the context of the invention, the arrangement of laser material, pumping lamp, and resonators is in accordance with conventional lasers systems. Similarly, aside from the employment of the novel pumping lamp described herein, the operation of the laser system of the invention is in accordance with known laser systems. The fluorescent lifetimes of laser material which can be used with the inventive pumping lamp can vary widely, for example, from less than $10^{-9}$ sec to $10^{-2}$ sec.

The composition employed as a light source or pumping means in accordance with the invention is preferably a volumetric light source, i.e., a light source in which the intensity of the emitted light can, to a certain degree, be increased by increasing the thickness of the composition. In accordance with the invention, volumetric light sources are preferred due to their ability to emit a high intensity of light by utilizing exciting radiation which can penetrate into the porous substrate.

However, the composition can function as a surface light source such as the phosphor layers employed in conventional radioluminescent (CRL) lamps. If the porous substrate is, for example, loaded to a high degree with the luminescent component, the excessive amount of luminescent component can cause scattering or absorption of emitted light so that the composition functions as a surface light source. While surface light sources are less preferred, such compositions still possess advantages over conventional flash lamps, e.g., low density, high strength, low coefficient of thermal expansion, etc. For a discussion of surface and volumetric light sources, see Walko et al., "Volumetric Light Source Theory," Radioluminescent Lighting Technology, Chapter 10, DOE Technology Transfer Conference Proceedings, Sep. 25-26, 1990, Annapolis, Md.

The pumping means according to the invention can also involve light trapping and wave guiding. This effect could be utilized to make a light source using thin sheets or long whiskers of, for example, transparently luminescently doped ZnS excited through its entire surface by a suitable exciting radiation source. The resultant light generated in the doped ZnS sheet or doped ZnS long whisker would then be wave guided to the edges of the sheet or the end of the whisker. This light would be intensified since nearly all the light produced in the ZnS volume would emerge from a small area.

Also, incorporating silica fibers in, for example, a phosphor/aerogel composite may provide a directional light source with a higher intensity. The fibers could aid in waveguiding light out from regions beyond the optical depth of the composite.

For ZnS sheets/whiskers to act as a useful waveguide, the main consideration is that the medium in contact with the sheets/whiskers must maintain a lower index of refraction than the ZnS during the light source's active lifetime.

As discussed above, one embodiment according to the invention involves a powdered phosphor dispersed throughout an aerogel and excited by the exciting radiation source. The resulting light is scattered out of the volume of the composition by the small, highly reflective phosphor particles. In the waveguide approach, the ZnS sheet could be thought of as an "extended" phosphor particle if it is cut and polished from a single crystal. The light generated in the sheet would then be guided out of the interior of the composite, being confined to the sheet by total internal reflection.

Alternatively, ZnS sheets made from transparent, polycrystalline, isotropic material could be thought of as a compaction of individual phosphor particles in close enough contact with each other to permit the light to be guided out. The polycrystalline material can be doped to make it luminescent. The doping process can, for example, be by a molten NaCl salt flux method. Other techniques which may permit doping after the ZnS sheets are cut out and polished, and which should not optically degrade the ZnS sheet surface, are: (1) ion implantation similar to what is used in the commercial electronic semiconductor industry and (2) high temperature exposure to HCl gas to achieve Cl doping. These techniques are also described in the references below.

While the above discussion refers mainly to 2-D waveguides, it should be noted that the principles also apply to long ZnS whiskers which would behave like fibers in fiber optics cables.

The following references discuss techniques for doping: Humboldt W. Leverenz, *An Introduction to Luminescence of Solids*. John Wiley & Sons, Inc., New York, 1950 (gives recipes and experimental procedures for the NaCl flux technique); S. Rothschild, "The Luminescent Spectra of Zinc Sulphide and Zinc Cadmium Sulphide Phosphors," Trans. Faraday Soc., Vol 42, No. 290, 635-642, 1946 (NaCl flux technique); F. A. Kroeger and J. E. Helligman, "The Blue Luminescence of Zinc Sulfide," J. Electrochem Soc., Vol 93, No. 5, 156-171, May 1948 (HCl gas doping results and techniques); M. R. Brown, A. F. J. Cox, W. A. Shand, and J. M. Williams, "Ion Implantation Doping of Zinc Sulphide Thin Films," Solid State Communications, Vol. 9, pp. 37-40, 1971; A. Addamiano, W. H. Lucke, and J. Comas, "Phosphor Preparation by Ion Implantation," Journal of Luminescence, Vol. 6, 143-145, 1973; and F. J. Bryant and R. H. Fewster, "Implantation of Ytterbium Ions into Group II-VI Compounds," Radiation Effects, Vol. 20, pp. 239-244, 1973.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius. Unless otherwise indicated, all parts and percentages are by weight.

The entire disclosures of all applications, patents and publications, cited above and below, are hereby incorporated by reference.

BRIEF DESCRIPTION OF THE DRAWINGS

Various other objects, features, and attendant advantages of the present invention will be more fully appreciated as the same becomes better understood when considered in conjunction with the accompanying drawings, in which like reference characters designate the same or similar parts throughout the several views and wherein.

DETAILED DESCRIPTION OF THE DRAWINGS

Figure 1:
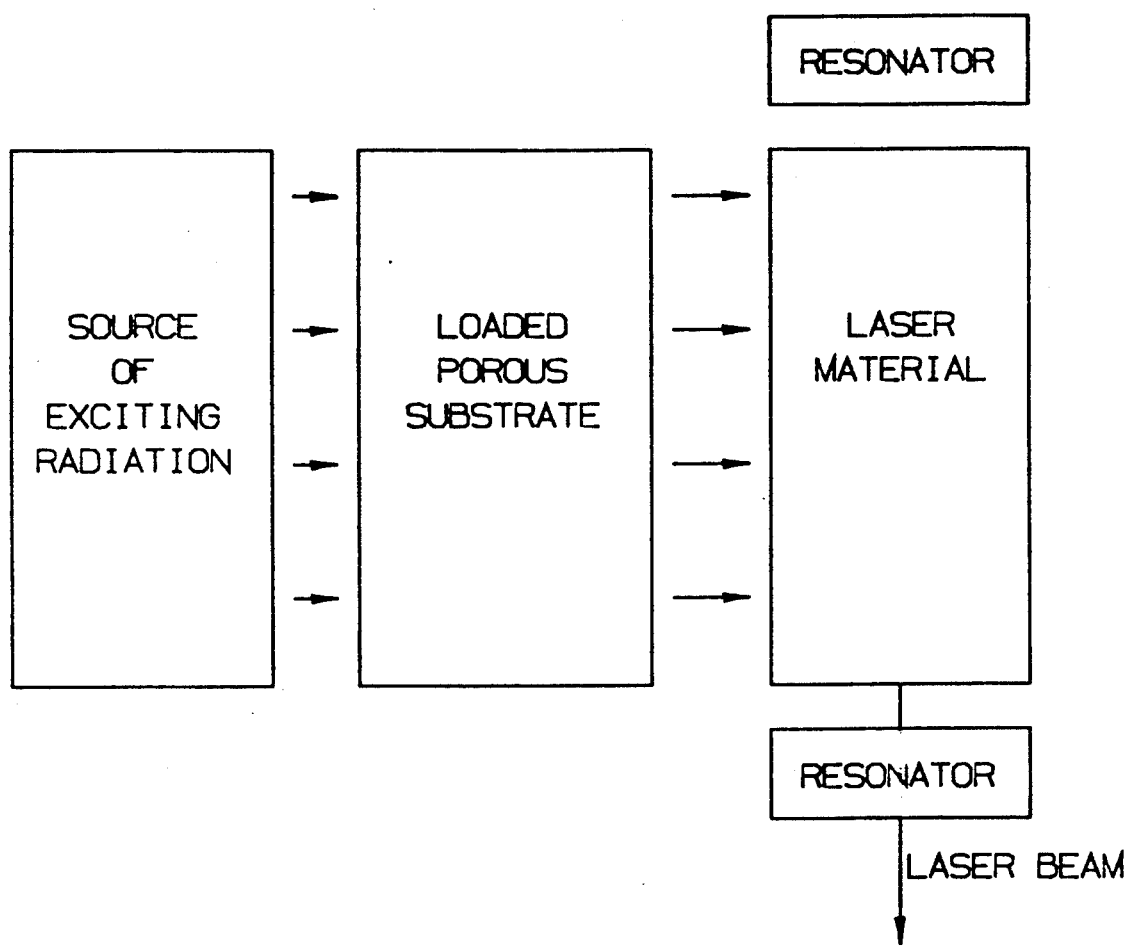
FIG. 1 illustrates a linear arrangement of exciting radiation source, pumping means, laser material.

Suitable arrangements of laser material, porous material (substrate and luminescent species), and source of exciting radiation are all those in which the exciting radiation can effectively induce the porous composite to emit light of a sufficient wavelength and intensity such that the emitted light will excite at least a threshold level of active atoms/molecules of the laser material, whereby a laser beam is formed.

For example, the composite and lasing material can be in the form of adjacent slabs, with the porous composite interposed between the lasing material and an electron gun or vacuum microelectronic emitter. See FIG. 1. Alternatively, the porous composite can be of an annular shape, with a laser rod positioned Within the central region thereof. The source of exciting radiation can then be positioned around the exterior of the annular porous composite. See FIG. 2.

EXAMPLES

Preparation of Aerogel/Phosphor Composite

One method for preparation of the aerogel/phosphor composite, involves the following four basic steps:
1. Preparation of a sol-gel stock solution;
2. gelation step, including suspending a phosphor in the stock solution, adding a "gelation promoter" to the mixture, and aging the gel;
3. removal of the original solvent from the gel pores by a solvent exchange/supercritical drying process; and
4. post-treatment (heat, vacuum ± atmosphere).

PROCESSING DETAILS

1. Preparation of the sol-gel stock solution

|  | Approx. molar ratio |
|---|---|
| 61 ml Tetraethoxysilane | 1 |
| 61 ml absolute ethanol | 4 |
| 5 ml deionized water | 1 |
| 0.2 ml 1M HCl | 0.0007 |

Add chemicals to a reaction kettle in the order listed. Seal and heat to 60° C. for 1.5 hr, with stirring. Cool to room temperature.

2. Phosphor suspension, gelation, and aging

Add from 0.05 to 10 grams of desired commercial phosphor powder to 10 milliliters (ml) stock solution (results in the reported phosphor loading ranging from 0.005 to 1.0 gram per cc of stock solution). The phosphor agglomerates in the stock solution are broken up using ultrasonic agitation (about 5 minutes). Two ml of 0.25 molar (M) $NH_4OH$ is added to promote gelation. The final $NH_4OH$ concentration is about 0.04 M (moles/liter) with a final water to metal alkoxide molar ratio (moles $H_2O/M(OR)$) of 6.6. [NOTE: the base catalyst range which will allow gel formation in this system is approximately $2.4 \times 10^{-4}$ M to $3.3 \times 10^{-1}$ M $NH_4OH$ which corresponds to a final molar $H_2O/M(OR)_x$ of about 2.6–14.6.] A portion of the sol/phosphor mixture is transferred to a 16 ml polystyrene test tube leaving a 6 ml air space (to form an air bubble which assures efficient mixing). The tube is placed on a commercial hematology mixer which provides end-to-end oscillation with continuous axial rotation ("rock-and-roll"). This is essential for homogeneous suspension of the phosphor particles. Immediately prior to gelation (as indicated by sluggish bubble movement) the tubes are set upright in a test tube rack. At this point, the viscosity of the solution is rapidly increasing and prevents settling of phosphor particles prior to gelation. The phosphor/gel composite is aged at 50° C. about 2 days to allow strengthening of the polymeric network.

3. Solvent exchange/critical point drying process

The solvent exchange/critical point drying process is performed in a commercial Critical Point Drying (CPD) apparatus. Gelled samples are immersed in an excess volume of ethanol in the CPD chamber. After the chamber is sealed, $CO_2$ liquid is directly transferred, at the cylinder pressure of about 850 psi, to the cooled chamber (about 18° C.). An equilibrium pressure of about 850 psi is maintained at 18°–20° C. while the vessel is periodically flushed with liquid $CO_2$ to dilute the excess solvent volume and replace the sample solvent within the gel pores. [NOTE: fast flush until no immiscibility line visible, slow flush for 24 hrs., fast flush 5 min.] When complete solvent replacement has occurred, the chamber temperature is increased to approximately 38° C. at a rate of about 0.33° C./min. At 31.1° C. and 1070 psi, $CO_2$ passes through its critical point and can no longer exist in the liquid state. The $CO_2$ gas is vented at a rate of less than 100 psi/hr while maintaining the chamber temperatures at 38° C., thus reducing the chamber pressure to ambient. The aerogel/phosphor composite is then removed from the chamber.

4. Aerogel post-treatment

After critical point drying treatment, further treatment is used to tailor the aerogel surface chemistry. Aerogels are heated to 150° C. while under vacuum ($10^{-8}$ Torr) to remove residual alcohol and physically adsorbed water.

Variations of standard Process

1. Other suitable precursors or sol processing conditions a. Most metal alkoxides and mixtures thereof, e.g., Cr-dope $Al_2O_3$. Reference: D. C. Bradley, R. C. Mehrotra, and D. P. Gaur, Metal Alkoxides (Academic Press, London, 1978).

b. Control $H_2O/M$, pH, temperature, concentration, solvent, etc. Reference: C. J. Brinker et al., J. Non-Cryst. Solids 63 (1984) 45–59. Advantages: control pore size, density, clarity, rigidity of aerogel matrix.

2. varying the phosphor suspension/dispersion a. In situ growth and activation of ZnS in wet gel, e.g., zinc salt + sulfidizing agent such as thioacetamide. Reference: D. M. Wilhemy and E. Matijevic, J. Chem. Soc. Faraday Trans., 80 (1984) 563.

b. In situ growth and activation of ZnS in porous dry gel, e.g., $Me_2Zn + H_2S$. Reference: G. E. Coates and D. Ridley, J. Chem. Soc. (1965) 1970. Advantages: same as 2a.

c. Grow or disperse ZnS whiskers or fibers in wet or dry gel. Reference: T. A. Guiton et al., in Better Ceramics Through Chemistry, MRS Symp. Proc. Vol. 121 (Materials Research Society, Pittsburgh, Pa., 1988 pp 503–508. Advantages: wave guiding from gel interior, strengthening.

d. Dispersion of ZnS particles in precursor sol by adsorption of polymers or surfactants with or without mechanical agitation. References: D. H. Napper, Polymeric Stabilization of Colloidal Dispersions (Academic Press, London, 1983). Th. F. Tadros (editor), Surfactants (Academic Press, London, 1984). Advantages: avoid agglomeration of ZnS particles in sol/gel.

3. Varying gelation, aging, and/or drying conditions a. Reduce gel density by reducing the sol concentration or by the addition of an immiscible solvent, foaming agents, etc. Advantage: reduce attenuation of light by matrix and also reduces electron beam energy absorption by the matrix.

b. Aging treatments under various solvent/pH/temperature conditions to optimize aerogel porosity and strength. Reference: C. J. Brinker and G. W. Scherer in Ultrastructure Processing of Ceramics, Glasses, and Composites, eds. L. L. Hench and D. R. Ulrich (Wiley, N.Y., 1984) p. 43. Advantages: maximize surface area, strength, clarity while minimizing density.

c. Alter the solvent exchange process prior to critical point drying to optimize surface area, strength and clarity, e.g., replace $CO_2$ with freon, or employ a multi-step exchange process such as ethanol→amyl acetate→$CO_2$.

4. Varying post-drying treatments a. Anneal ZnS in different ambients to enhance phosphor activation.

b. Remove residual organics with steam, ozone, peroxide, or plasma treatments.

EXAMPLE II

Figure 2:
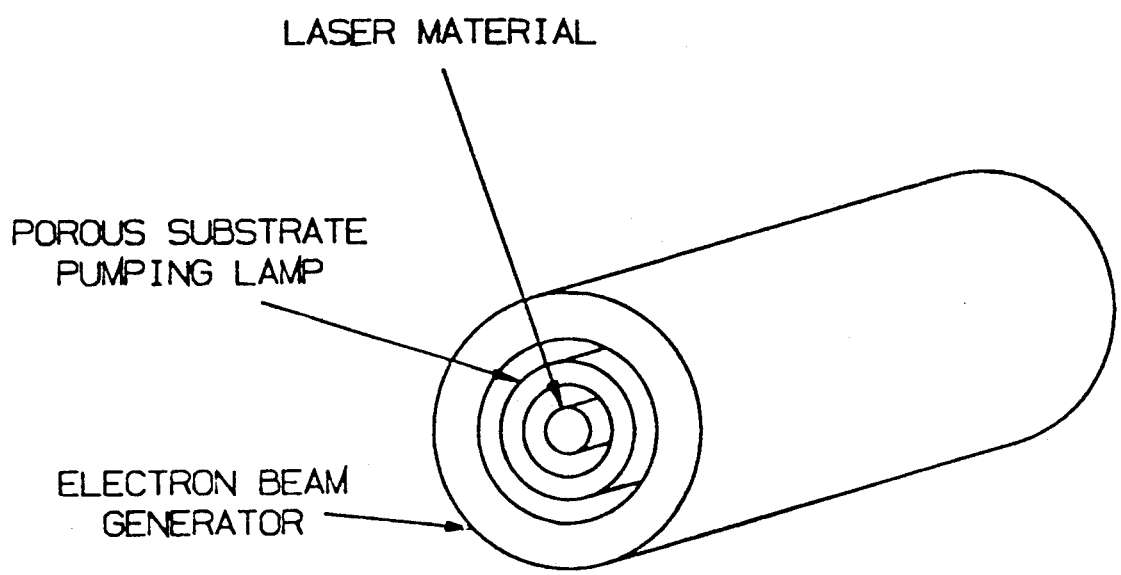
FIG. 2 illustrates an embodiment having an annular arrangement.

Referring to FIG. 1, the source of exciting radiation is an electron beam having an energy level of 100,000 eV. An $SiO_2$ aerogel loaded with ZnS:Tm phosphor is employed as the loaded porous substrate. The excited ZnS:Tm phosphor emits radiation having a wavelength of 470 nm upon interaction with the electron beam. The laser material is titanium sapphire, which possesses a peak adsorption of about 470 nm. Adsorption of the phosphor-emitted radiation by the laser material generates a laser beam at 690 nm.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a laser apparatus for use in generating a laser beam, said apparatus comprising a lasing material and pumping means, the improvement wherein said pumping means comprises a porous substrate loaded with a component capable of emitting light upon interaction of the component with exciting radiation.

2. The pumping mans of claim 1 wherein said porous substrate is a transparent xerogel or aerogel, said component is a luminescent material, and said exciting radiation is an electron beam.

3. A laser apparatus comprising:
a laser material;
a porous substrate loaded with a component capable of emitting light upon interaction of said component with exciting radiation; and
a source of exciting radiation,
wherein, upon interaction with exciting radiation, the loaded porous substrate can emit light within the absorption band width of said laser material and of a sufficient intensity to generate a laser beam.

4. A laser according to claim 3 further comprising resonator means.

5. A laser according to claim 4, wherein said porous substrate is transparent with respect to said exciting radiation and said light and said component is a luminescent material.

6. A laser according to claim 5, wherein said substrate is a xerogel or aerogel.

7. A laser according to claim 6, wherein said substrate is an aerogel.

8. A laser according to claim 7, wherein said component is a phosphor.

9. A laser according to claim 8, wherein the particle size of said phosphor is 0.001–20 μm.

10. A laser according to claim 8, wherein said phosphor particle size is 2–20 μm.

11. A laser according to claim 9, wherein the particle size of said phosphor is wit the range of 0.01–0.4 μm.

12. A laser according to claim 8, wherein the loading of said phosphor is 0.005–1.0 g/cc of the composition.

13. A laser according to claim 8, wherein said phosphor is zinc sulfide doped with silver.

14. A laser according to claim 8 wherein said phosphor is zinc sulfide doped with thulium.

15. A laser according to claim 8, wherein said component comprises phosphor whiskers incorporated into said aerogel substrate.

16. A laser according to claim 8, wherein said composition further comprises silica fibers incorporated into the phosphor/aerogel composite.

17. A laser according to claim 7, wherein said aerogel is a silica aerogel.

18. A laser according to claim 7, wherein the density of said aerogel is 0.01–1.5 $g/cm^3$.

19. A laser according to claim wherein said component is a photoluminescent material.

20. A laser according to claim 19, wherein said photoluminescent material is a uranium compound loaded into said aerogel substrate.

21. A laser according to claim 7, wherein said aerogel substrate has a porosity of at least about 85 vol %.

22. A laser according to claim 7, wherein said aerogel substrate has a surface area of at least about 500 $m^2/g$.

23. A laser according to claim 7, wherein said aerogel substrate transmits at least about 50% of the light generated by said component.

24. A laser according to claim 7, wherein the duration of the pump pulse of light emitted is smaller than the fluorescence lifetime of said laser material.

25. A laser according to claim wherein said aerogel substrate has a density of 0.075–0.30 $g/cm^3$ and a surface area of 600–1200 $m^2/g$.

26. A laser according to claim 7, wherein said exciting radiation is an electron beam with an energy of $100–10^6$ electron volts.

27. A laser according to claim 7, wherein said exciting radiation is 3 ev–9 ev ultraviolet light.

28. A laser according to claim, wherein said exciting radiation is 1.5 ev–3 ev visible light.

29. A laser according to claim 7, wherein said exciting radiation is 0.1 ev–1.5 ev infrared light.

30. A method of forming a laser beam comprising pumping a laser material with a flash lamp wherein said flash lamp is a porous substrate loaded with a component capable of emitting light, upon interaction of said component with an exciting radiation, wherein the emitted light is within the absorption band width of the laser material and of a sufficient intensity to generate a laser beam, and
    wherein said flash lamp is activated by exposing said component to exciting radiation from a source thereof.

31. A method of optically pumping a lasing material comprising subjecting the laser material to light emitted from a component, said component being loaded in a porous substrate, wherein said component emits light by exposure to a source of exciting radiation.

* * * * *